July 9, 1929.  G. P. DORRIS  1,720,513
COMBUSTION ENGINE
Filed Sept. 1, 1927  3 Sheets-Sheet 2

INVENTOR:
GEORGE P. DORRIS
By W.L.Dempsey,
ATTORNEY.

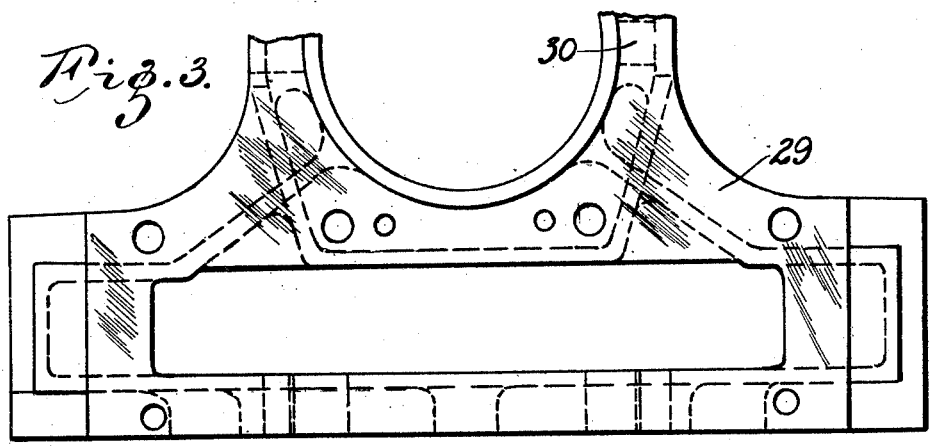
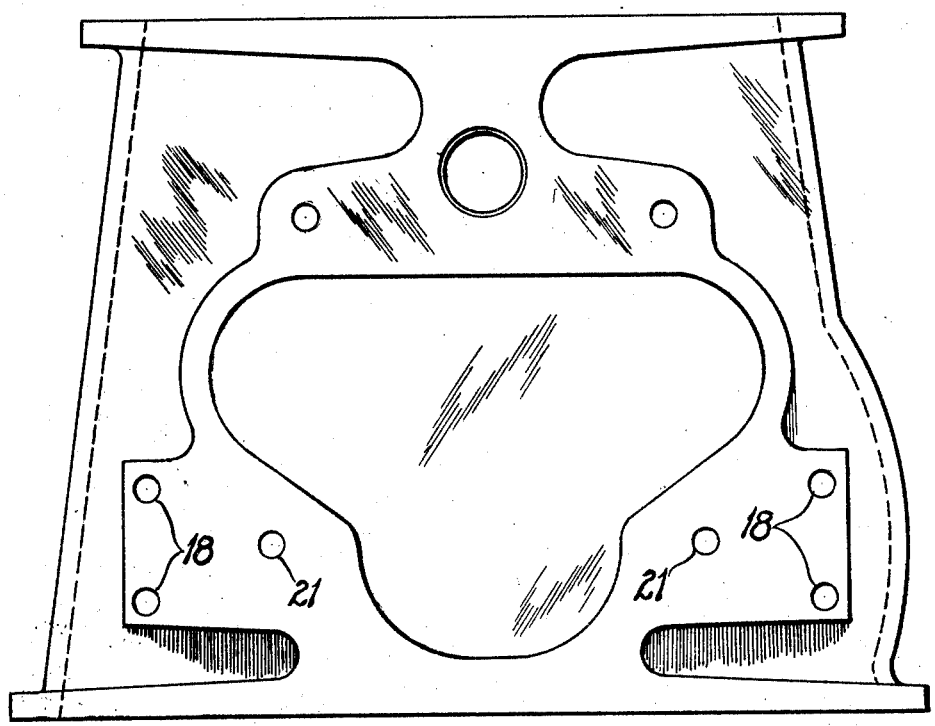

Patented July 9, 1929.

1,720,513

UNITED STATES PATENT OFFICE.

GEORGE P. DORRIS, OF ST. LOUIS, MISSOURI.

COMBUSTION ENGINE.

Application filed September 1, 1927. Serial No. 216,891.

My invention relates to internal combustion engines, with particular reference to improvements in timing gears.

The chief object of my invention is to provide means for facilitating the adjustment of the timing gears with accuracy and delicacy, thereby increasing the life of the gears and reducing the noise of operation.

Another object of my invention is to provide means for so positioning the timing gears relative to the crankshaft that they will be free from the destructive effects of the torsional vibration of the crankshaft.

Another object of my invention is the production of a cylinder block having a housing cast integral with the cylinder block and, also, cast in such a way as to facilitate surfacing and machining, thereby substantially reducing the cost of production.

A still further object of my invention is to provide means for mounting magnetos and other accessories upon the rear end of the engine where they will be less affected by the torsional vibration of the crankshaft, and at the same time so mount the motor accessories as to eliminate side shafts thereby preserving a neat, attractive engine and reducing the cost of production.

Other and further objects and advantages of my invention will be apparent from the description, claims and drawings, in which—

Fig. 3 is a plan view of a section along the line 3—3 in Fig. 1.

Fig. 4 is a rear elevation along the line 4—4 in Fig. 1.

It is well known to automotive engine builders that for the successful operation of an automotive engine it is necessary that the timing gears mesh with extreme accuracy to prevent noise and excessive wear. The present practice is to mount the timing gears upon the front end of the engine. The objection to this method, which my invention is intended to overcome, is that the timing gears are affected by the torsional vibration of the crankshaft from which they are driven.

When the crankshaft bearing is closely fitted, it is well known that the front end of the crankshaft "whips" back and forth. It is obvious that when the front crankshaft bearing is loosely fitted, or ordinary wear takes place, the "whipping" effect becomes more pronounced.

To overcome this objectionable feature various attempts have been made, such as the use of an additional flywheel on the front end of the crankshaft, and other forms of vibration dampeners.

My invention involves means for driving the timing gears (and by the term "timing gears" I desire it understood that this term includes also the so-called "silent chains") from a cup gear mounted on the rear end of the crankshaft, between the crankshaft flange and the flywheel where the vibrations of the crankshaft are dampened out or entirely eliminated by the flywheel.

Another objection which my invention is intended to overcome is the noise and undue wear of the timing mechanism occasioned by the "whipping" of the crankshaft.

Figure 1:
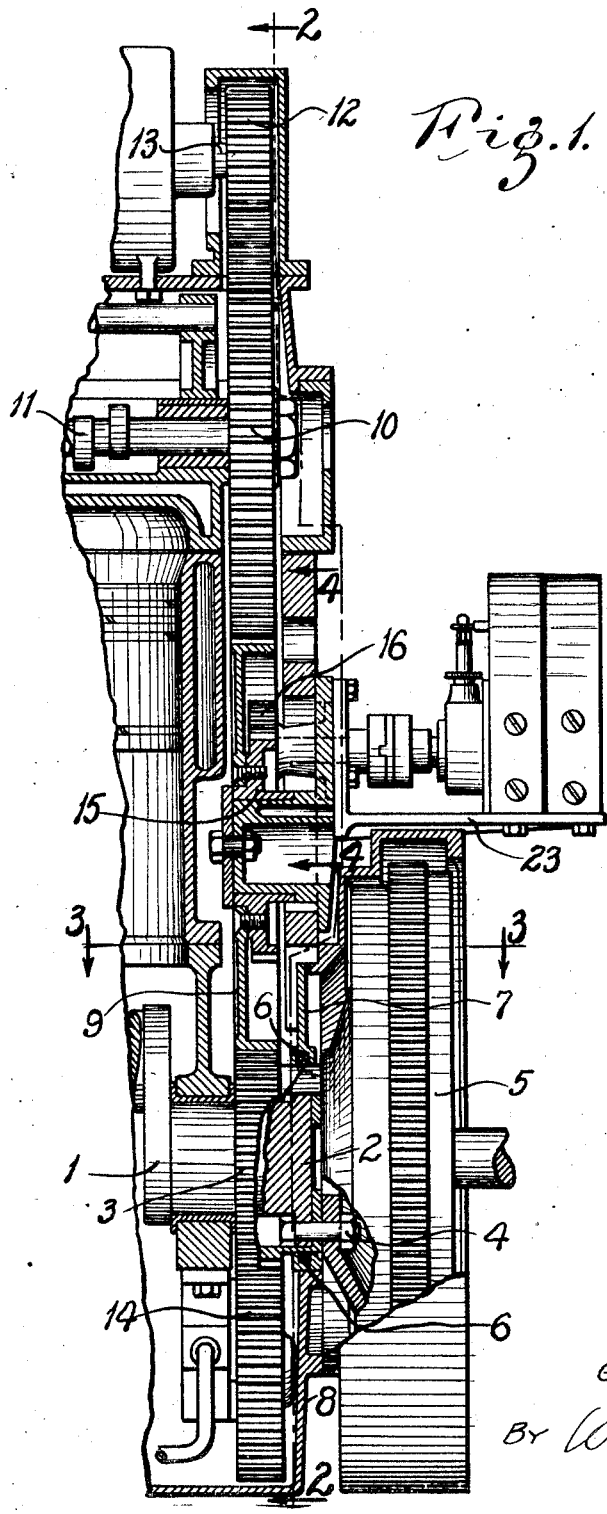
Fig. 1 is a side elevation, partly in section and partly in perspective, of the rear end of a multiple cylinder combustion engine, embodying my improvements.

In Fig. 1 is shown the rear end of an ordinary multiple cylinder engine, the crankshaft 1 being provided at its rear end with a radially disposed flange 2 forged integral with the crankshaft. A hollow, cylindrical gear 3, having one end inwardly flanged, is adapted to be slipped over the crankshaft flange 2 and to be bolted thereto by a plurality of bolts 4, which are also used to hold in place the flywheel 5.

To prevent the escape of oil, a felt washer 6 is provided and held in place by the closure plate 7 rigidly attached to the end of the crankcase 8.

The cylindrical gear 3, styled a cup gear, meshes with the idler gear 9 and transmits rotary motion to a camshaft gear 10 rigidly attached to the camshaft 11. The camshaft gear 10, also, meshes with the generator gear 12 directly mounted upon the shaft of the generator 13. The cup gear 3 also meshes with the oil pump gear 14 operatively mounted in the rear end of the crankcase.

Another gear 15 mounted upon the shaft of the idler gear 9, or maybe integral therewith, and serves to drive the magneto gear 16, or other motor accessory.

Fig. 4 is a rear vertical elevation of the rear end of the engine after having been surfaced and illustrates one of the main features of my invention, which is the means for reducing the cost of production. When a planer or surfacing machine is once set, the entire facing may be done at one operation, and when the boring machine has once been set up a plurality of holes may be bored and tapped in the same space of time it would require to bore and tap a single hole.

Tap bolts 17 having rectangular heads are firmly screwed into the screw-threaded openings 18. The heads of the bolts are transversely bored and screw-threaded to receive set screws 19, the purpose of which will be later described. Stud bolts 20 are firmly screwed into the screw-threaded openings 21, best shown in Fig. 4.

Figure 2:
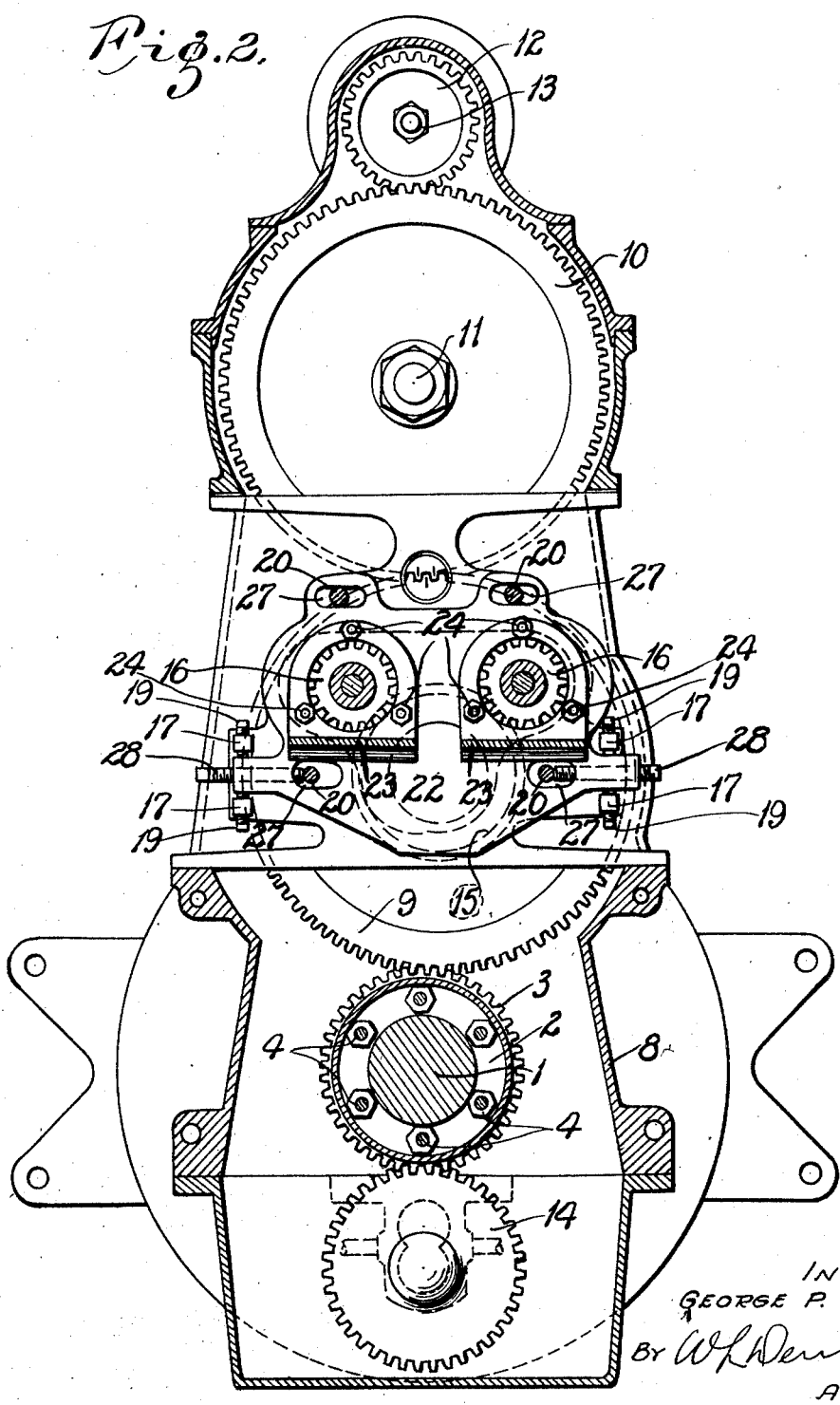
Fig. 2 is a rear elevation of an engine embodying my improvements, made along the line 2—2 in Fig. 1.

An adjustment plate 22 best shown in Fig. 2, provides an adjustable mounting for the idler gear 9 and magneto gears 16, the magnetos being mounted upon a rectangular bracket 23, securely bolted to the adjustment plate 22 by the bolts 24. The adjustment plate 22 is held in position at the top by clamping bolts 20 provided with suitable heads, not shown, which hold the adjustment plate firmly in position when the bolts are drawn tight.

The adjustment plate 22 is slotted at 27, lateral adjustment being secured by screwing in or out the adjusting screws 28. The adjustment plate 22 may be adjusted upwardly and downwardly by the adjusting screws 19, the nuts on the bolts 20 having first been loosened and then re-tightened after the proper adjustment has been made.

The cross-sectional plan view in Fig. 3 indicates the method of casting the housing 29 with the cylinder block 30, by which means I am enabled to provide a suitable mounting for the adjustment plate 22, which carries the idler wheel 9, together with magnetos or other motor accessories.

It is obvious that by the use of the adjusting screws shown the idler wheel 9, together with the magneto gears can be shifted radially in any direction desired and can, also, be raised and lowered. It is further obvious that these adjustments can be made with extreme nicety and delicacy so that the timing gears mesh perfectly, thereby avoiding excessive wear and noise.

It is, also, obvious that should it be necessary to use more than one idler gear, the same adjustment could be applied, hence I do not wish to confine my invention to a single idler gear, as in some cases more than one idler gear is desirable.

Having fully described my invention, what I claim as new and useful and desire to protect by Letters Patent is:

1. A combustion engine of the class described, comprising means for transmitting power from a cup gear affixed between the rear flange of a crankshaft and a flywheel, to a camshaft.

2. A combustion engine of the class described, comprising means for transmitting power from a cup gear rigidly attached to and enclosing the flanged end of a crankshaft, to the camshaft of said engine, said cup gear meshing with one of a train of gears operatively connecting said crankshaft and said camshaft.

3. A combustion engine of the class described, comprising a train of gears for transmitting power from a gear rigidly attached to the rear end of a crankshaft to a camshaft, one of the intermediate gears of said train being rotatably mounted upon an adjustable base-plate capable of being radially adjusted, an adjustable base plate on which said intermediate gear is rotatably mounted, means for adjusting said base plate radially in all directions, means for holding said base plate in adjusted positions.

4. A combustion engine of the class described, comprising a power transmitting train of gearing in which an idler gear in said train may be minutely adjusted in all directions relative to other gears in said train, means for adjusting said idler gear radially in all directions, housing means integrally cast with the cylinder block of said engine for enclosing said train of gears, means for connecting said train of gears to said cylinder block.

5. A combustion engine of the class described, comprising means for transmitting rotary motion from the crankshaft of said engine to its camshaft, said means consisting of a hollow, cylindrical gear open at one end adapting it to enclosed the flanged end of a crankshaft and having its opposite end closed adapting it to be affixed to the said flanged end of said crankshaft and to be held rigidly against said flange by the same bolts that hold the flywheel of said engine in place, external gear teeth about the periphery of said hollow cylinder adapted to mesh with the teeth of an idler gear, an idler gear adjustably mounted upon a base plate affixed to the rear of a multiple-cylinder engine block, means for adjusting said idler gear in minute stages radially in all directions, a camshaft gear rigidly attached to a rotatable camshaft and adapted to mesh with and be driven by said idler gear when said idler gear has been adjusted in various positions relative to said cylindrical gear and said camshaft gear, an adjustable base plate upon which said idler gear is rotatably mounted, means for holding said base plate firmly in adjusted positions.

In witness whereof I have hereunto affixed my signature this 23rd day of August, 1927.

GEORGE P. DORRIS.